United States Patent Office 3,051,524
Patented Aug. 28, 1962

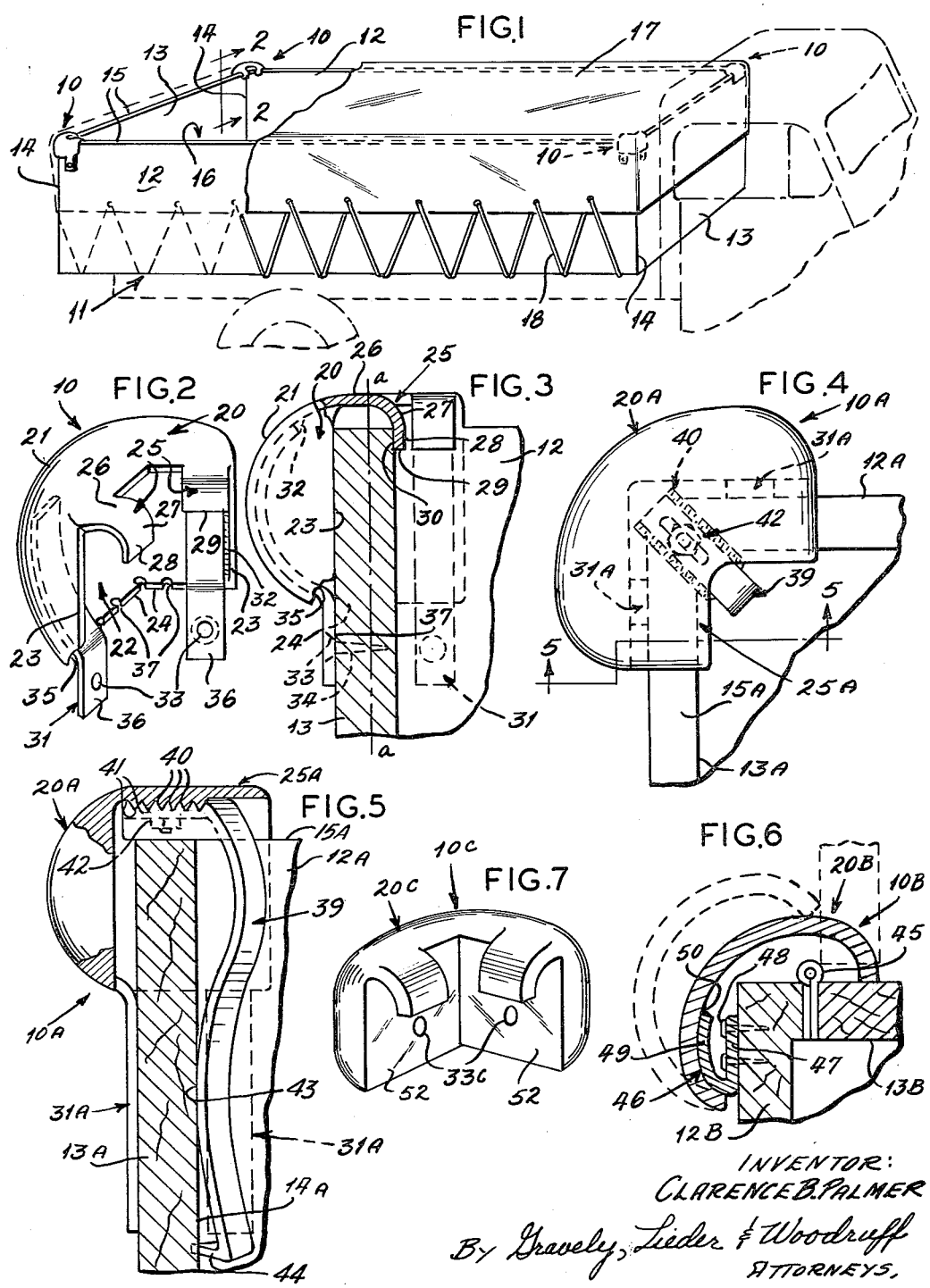

3,051,524
GUARD DEVICE
Clarence B. Palmer, Lincoln County, Mo.
(R.F.D. 1, Old Monroe, Mo.)
Filed Aug. 26, 1959, Ser. No. 836,180
5 Claims. (Cl. 296—100)

This invention relates generally to guard devices and more particularly to a protective guard and support for a vehicle body having a flexible cover.

An object of the present invention is to provide a protective member for reducing localized stresses in coverings for trucks and like vehicles thereby preventing tearing and excessive wear of the covering and obviating the need for reinforcing pads in the corners of the covering. More specifically, it is an object to provide a rounded corner guard or shield for the corners of an open top truck body over which a tarpaulin or like covering can be easily stretched without damaging the covering. It is also an object to provide a strong, simple and economical means shielding truck body corners and protecting flexible coverings. These and still other objects and advantages will become more apparent hereinafter.

The invention is embodied in a rounded member adapted to be secured to a truck body opening at a point at which excessive stress normally occurs in a flexible covering for the opening, the rounded member providing a substantial area for contact by a covering for reducing the stress therein.

The invention also consists in the parts and in the combinations and arrangements of parts hereinafter described and claimed. In the accompanying drawing which forms a part of this specification and wherein like numerals refer to like parts wherever they occur:

FIG. 1 is a perspective view of an embodiment of the present invention as applied to a typical truck body having a covering therefor, FIG. 2 is a greatly enlarged perspective view of the guard device shown in FIG. 1, FIG. 3 is a greatly enlarged side elevational view, partly in section, of the guard device secured on a truck corner as seen from line 2—2 of FIG. 1, FIG. 4 is a greatly enlarged top plan view of another embodiment of a guard device mounted on a truck corner, FIG. 5 is a greatly enlarged sectional view taken along line 5—5 of FIG. 4, FIG. 6 is a horizontal cross-sectional view of another embodiment of the guard device, and FIG. 7 is a greatly enlarged perspective view of another form of the present guard device.

Referring now to FIG. 1 of the drawing, it will be seen that the invention is embodied in a guard device 10 for a truck body 11 having opposed side walls 12 and opposed end walls 13 joined together at corners 14, the side and end walls having top margins 15 and defining an open top compartment 16 adapted to be covered by a tarpaulin or like flexible covering 17, preferably waterproof, for protecting articles carried in the truck body.

The rectangular truck body in FIG. 1 is shown merely for purposes of illustration, the term truck body is used herein as a generic term for all types of trucks, trailers, wagons and like constructions over which a covering may be placed to protect contents from exposure. Similarly, although an open top construction is shown, side or vertical openings may be covered by tarpaulin and the present invention is equally useful in protecting the tarpaulin from damage in such an arrangement. It should be noted that tarpaulins used to cover open top truck bodies as shown in FIG. 1 are generally handled roughly, the tarpaulin being pulled own hard over the angular upper margins 15 of the corners 14, drawn taut and lashed or tied down by ropes or lines 18. Accordingly, the present invention is particularly useful in this type of construction.

The guard device 10 may be constructed from a variety of materials, such as metal, hard rubber, plastic or wood, and may be formed in different shapes and sizes. However, the guard member 10 must be strong, relatively rigid, light weight, smooth and must have a rounded exterior contour. The guard should be strong enough to resist sharp blows or high pressures that may be exerted against the truck body 11, and the guard may be slightly resilient or compressible under such forces. However, the guard is substantially rigid with regard to the forces exerted thereon in applying a covering to the truck body.

Referring to FIGS. 2 and 3, the guard member 10 comprises a body portion 20 formed of sheet metal or like material having a wall of substantially uniform thickness and in the form of a shell. The body portion 20 has a rounded exterior surface 21, which is preferably substantially spherical at the central corner covering area and has the same horizontal and vertical curvatures. However, immediately adjacent to the periphery of the exterior surface, this surface may be formed on a sharper radius and turn inwardly to reduce the overall area of the truck body covered by the guard 10. The body also has a hollow interior or cavity 22. The periphery of the body 20 includes co-planar side and bottom margins 23 and 24 for abutment with the side and end walls 12 and 13 of the truck body 11, and the upper portion of the body 20 extends beyond the planes of these margins for covering the top margins 15 of the side and end walls 12 and 13. The upper or wall covering portion of the guard device 10 may include downturned flanges 25 for securing the device to the walls of the truck body. The flanges 25 have a horizontal portion 26 extending from the margins 23 a predetermined distance, an arcuate portion 27 curving downwardly and a vertical portion 28 having a free margin 29. Accordingly, the guard or shield 10 can be secured on walls of different thickness as shown in FIG. 3 wherein the wall 13 represents a maximum thickness wall extending between the margins 23 and the inner face 30 of the vertical portion 28 of the flange 25, and phantom line a—a represents another wall of thinner dimension than the wall 13. It will be appreciated that since many truck walls are made of wood, the guard may be forced down over the wall to obtain a snug fit, and this condition may exist for varying thicknesses of walls due to a predetermined curvature of the arcuate portion 27 of the flanges 25. Obviously, if the angle of tangency to the arcuate portion 27 from vertical is more acute, a guard 10 positioned over a wall contacting the arcuate portion will be more firmly held. However, it may be desired to form the guard device 10 of a bendable metal rather than a material having a degree of resilience so that the flanges 25 may be bent inwardly during installation on a truck body 11.

The guard device 10 also includes means for securing the body portion 20 in fixed position on the walls 12 and 13. In the embodiment shown in FIGS. 2 and 3, this means comprises leg members 31 which extend into the shell and are secured thereto by suitable means, such as rivets, bolts or welding 32. Each leg member extends below the lower margin 24 of the body and has at least one opening 33 through which a screw 34 or other fastener may be inserted for securing the guard device 10 to the truck body. The lower margins 24 of the body may be notched or recessed as at 35 so that the truck wall abutting surface 36 of each leg member 31 is substantially coplanar with the margins 23 and 24 adjacent thereto. It is apparent that the vertical portions 28 of the flanges 25 may also be extended downwardly, and openings (not shown) may be formed therein for fastening means. In addition, openings or slots 37 may be formed in the lower portion of the body 20 to permit water drainage if the guard is exposed to the weather without a covering 17.

In a typical open top truck body 10, the exterior corner 14 at the top margins 15 of the juncture of the plane surfaces of walls 12 and 13 is generally relatively sharp or pointed and the act of pulling a tarpaulin 17 or like covering over such corners results in excessive strain being exerted on the material during this action which, together with the stress or tension in the tarpaulin when fastened over an angular corner, produces rapid wear or may result in actual tearing or ripping of the material. This condition is especially prevalent where other sides or corners of the tarpaulin are already secured, and may result either in fitted or contour covers made to the actual dimensions of the truck body or in flat tarpaulins which extend across the opening and are drawn over the sides and corners of the truck body 11. Reinforcing pads (not shown) are frequently sewn at the corner locations of both fitted and flat coverings, but wear has resulted nevertheless, and the necessity for such pads is obviated by the present invention.

The present guard device 10 is secured at the corners or at other points of the truck body 11 where excessive wear of the covering 17 occurs due to the angularity of walls, supporting posts or the like, the guard device 10 providing a smooth rounded or non-angular surface minimizing strain of the covering fabric or stress therein during the time it is in secured position and subjected to the unpredictable forces exerted thereon by reason of the movement of the truck. The guard device 10 provides a rounded corner without substantially enlarging the external dimensions of the truck body 11 or extending the covering 17 thereabove. It is also apparent that the guard device 10 does not materially extend into the interior of the truck body and take up space therein.

It will be understood that in many truck body constructions one end thereof may constitute a gate which is removable or hinged to the side walls or bed for easy access to compartment. Accordingly, it is also within the scope of the present invention to provide a removable guard device 10A, as shown in FIGS. 4 and 5. The spherical body portion 20A of the guard device 10A is similar in contour to the form of the invention shown in FIGS. 2 and 3, but is shown to be formed as a solid member having integrally formed leg members 31A adapted merely to abut against the exterior surfaces of the walls 12A and 13A. The body 20A also has a corner covering portion 25A extending horizontally over the upper margins 15A of the walls 12A and 13A at the corner 14A. The guard device 10A includes a releasable clamp member 35 preferably made of spring steel for exerting a pressure in opposition to the leg members 31A whereby the guard is firmly, but removably, held in position on the truck body. The upper portion of the clamp 39 includes serrations 40 for engagement with mating serrations 41 formed on the inner surface of the corner covering portion 25A of the guard 10A, and the upper end of the clamp 39 may be adjustably secured to to the body 20A by suitable slotted adjustment means shown at 42 in FIGS. 4 and 5. The clamp also has a curved abutment portion 43 intermediate its upper and lower ends and a tooth 44 is formed on the lower end for biting into the corner 14A. It is apparent that the guard device 10A may be secured to a truck body 11 at the corners of a removable or swingable end gate and may be removed to enable the truck body to be loaded and unloaded.

It is possible, of course, to provide a fixed shield or guard 10 which will be clear of the end gate and still function as a protective corner pad for a tarpaulin. Referring to FIG. 6, it will be seen that an end gate 13B is connected to a side wall 12B by a hinge 45 for swinging movement between a closed position shown in full lines and an open position shown in phantom lines. A modified guard device 10B having a body portion 20B similar in shape to the guard body 20 in FIG. 2 but having no flanges 25 or leg members 31, is hinged to the side wall 12B by a spring steel member 46. The spring member 46 is substantially U-shaped in cross-section having a truck wall connecting leg 47 secured by suitable means 48 to the wall 12B and a guard connecting leg 49 secured to the interior surface of the guard body 20B by welds 50 or the like. The spring member 46 normally biases the guard member 10B to a corner covering position shown in full lines when the end gate 13B is closed, and the end gate is adapted to act on the guard to swing it to its phantom line position when the gate is opened.

In FIG. 7 is shown a cast or molded guard device 10C having angularly related abutment surfaces 52 substantially complementary to the angular plane surfaces of the walls 12 and 13 of the truck body to which the guard device is attached, and having an exterior contour similar to the guard shown in FIGS. 2 and 3. In the guard 10C, openings 33C for fastening means are formed directly through the body portion 20C. The margins 23 and 24 of the body 20 of FIG. 2 or the abutment surfaces 52 of the body 20C of FIG. 7 and similar parts of other figures of the drawing constitute attachment surfaces for securing the guard to the angular corner of the truck body.

This specification is intended to cover all changes and modifications of the present invention which will be readily apparent to all skilled in the art, and the invention is to be limited only by the claims which follow.

What I claim is:

1. A guard device for shielding the corner formed by angularly related walls of a truck body having a flexible cover, said guard device comprising a body portion having angularly related abutments for contact with angularly related walls of a truck body, a rounded exterior surface for supporting a flexible cover, and means for securing the body portion to a wall of a truck body including a flange connected to said body portion and extending away from the exterior surface substantially normal to the plane of one of the abutments, said flange having an arcuate portion curving into a plane substantially parallel with said one abutment and spaced therefrom for receiving a wall of a truck body therebetween.

2. The guard device according to claim 1 in which a depending lug is formed below said body portion having a surface for abutment with one of the angularly related walls of the truck body, and an opening in said lug to receive fastening means for securing the guard device to the one wall.

3. The guard device according to claim 1 in which said body portion is hollow, and drain openings are formed in the lower portion of said body portion.

4. The guard device according to claim 1 wherein said body portion is provided with an opening therethrough for receiving fastening means to secure said guard device to a truck body.

5. A guard device for shielding the corner formed by angularly related walls of a truck body having a flexible cover, said guard device comprising a body portion having abutment surfaces for contact with the angularly related walls of the truck body, a rounded exterior surface for supporting a flexible cover, and means for securing the body portion to a wall of the truck body including flange means connected to said body portion and extending away from the exterior surface, said flange means including an arcuate portion curving into spaced opposed relation with said abutment surfaces for receiving a wall of the truck body therebetween.

References Cited in the file of this patent

UNITED STATES PATENTS

| | | |
|---|---|---|
| 213,016 | Walker | Mar. 4, 1879 |
| 721,165 | Duggan | Feb. 24, 1903 |
| 1,294,148 | Oliver | Feb. 11, 1919 |
| 1,760,144 | Kaner | May 17, 1930 |
| 2,889,171 | Morris | June 2, 1959 |